United States Patent [19]

LaLone et al.

[11] Patent Number: 5,785,218

[45] Date of Patent: Jul. 28, 1998

[54] CARRIER BRACKET FOR READY-TO-MOUNT SPARE WHEEL AND BEARING ASSEMBLY

[76] Inventors: Jeff J. LaLone, 2712 Newberg Rd., Snohomish, Wash. 98290; David W. Cobb, 9608—6th Pl. NE., #A, Everett, Wash. 98205

[21] Appl. No.: 897,575

[22] Filed: Jul. 21, 1997

[51] Int. Cl.$^6$ .................................................. B62D 43/00
[52] U.S. Cl. .................................. 224/42.24; 224/42.13
[58] Field of Search ........................... 224/42.12, 42.13, 224/42.14, 42.15, 42.16, 42.23, 42.24, 42.26; 248/213.2, 309.2; 280/767, 288.4, 304.5

[56] References Cited

U.S. PATENT DOCUMENTS

| | | |
|---|---|---|
| 1,311,267 | 7/1919 | Draver .................. 224/42.15 |
| 1,322,678 | 11/1919 | Draver .................. 224/42.15 |
| 1,322,680 | 11/1919 | Draver .................. 224/42.15 |
| 1,759,212 | 5/1930 | Wasserfallen . |
| 2,797,036 | 6/1957 | Geiger . |
| 3,081,924 | 3/1963 | Merbler et al. . |
| 3,655,220 | 4/1972 | Rodgers . |
| 3,879,058 | 4/1975 | Horn . |
| 3,880,335 | 4/1975 | Winkler .................. 224/42.13 |
| 4,089,449 | 5/1978 | Bayne et al. .......... 224/42.24 |
| 4,219,213 | 8/1980 | Butcher . |
| 4,469,348 | 9/1984 | Crook . |
| 4,738,382 | 4/1988 | Natori . |
| 4,915,274 | 4/1990 | Oliver .................... 224/42.24 |

*Primary Examiner*—Allan N. Shoap
*Assistant Examiner*—Gregory M. Vidovich
*Attorney, Agent, or Firm*—Graybeal Jackson Haley LLP

[57] ABSTRACT

A bracket is disclosed for holding a ready-to-mount spare wheel rim and tire, hub and bearings in which the bracket has a threaded stud welded to an anchor structure that is to be mounted on a vehicle, such as a boat trailer tongue, and an adjustable disk-shaped backing plate is positioned along the stud. The spare wheel hub, including inner seal, and inner and outer bearings, is held between the disk backing plate and a holding nut threaded onto the free end of the stud, and the spare wheel rim and spare tire are secured to the hub and flange.

12 Claims, 3 Drawing Sheets

CARRIER BRACKET FOR READY-TO-MOUNT SPARE WHEEL AND BEARING ASSEMBLY

BACKGROUND OF THE INVENTION

The present invention relates to devices for holding spare wheels on wheeled vehicles such as boat, horse and general utility trailers.

Carrying a spare tire on a trailer is an established precaution. However it is believed that a large percentage of trailer breakdowns are due to bearing failures. Trailers of all types, but especially boat trailers, are often left outside, uncovered and used only occasionally and without adequately servicing the bearings. Moreover, boat trailers are commonly driven into the water and partly submerged when launching and retrieving the boat. This causes exposure to the damaging effects of warm bearings being suddenly covered with water. When used in salt water, the corrosive effects are severe. Thus trailers for boats are most susceptible to these bearing problems, and the damage becomes apparent only after being driven for a while, stranding the vehicle between destinations. Having just a spare tire and rim does nothing to help the user get back on the road when a wheel bearing overheats and/or locks-up.

SUMMARY OF THE INVENTION

The present invention in its preferred embodiment described herein provides a carrier bracket that holds in ready-to-mount condition all of the parts needed to replace the broken trailer wheel including: a wheel hub and prelubricated inner and outer bearings with seal, bearing protector cover or spring loaded grease reservoir, a wheel nut, and wheel rim with mounted spare tire. The bracket has an anchor plate structure adapted to be mounted on the vehicle, such as the tongue of a boat trailer, and a threaded stud is affixed, such as by welding, to the anchor plate so as to project away from the trailer into a stowage space for receiving the spare wheel assembly. A backing plate, sized to provide a stop against which an inside end of the wheel hub rests, is secured on the stud at a selected and adjustable spacing from the anchor plate. The wheel hub with the seal and inner bearing installed is placed over the free end of the stud followed by the outer bearing and then a washer and nut threaded on to the stud to secure the hub and bearings in place. Then a bearing protector, preferably including a spring loaded grease reservoir, is installed over the secured outer end of the hub, and finally the wheel rim and mounted inflated tire are bolted to the hub flange with spare wheel lugs. An elastomeric seal or washer is preferably placed on the stud above the backing plate to keep dust from entering the hub where the inside bearing seal fits over the threaded stud. The wheel and bearing assembly is ready for an emergency by simply removing the nut and taking the spare hub and bearings and wheel rim with tire off the carrier stud and slipping them on to the trailer axle spindle and installing the wheel nut and bearing cover. The bracket is durable, convenient to the user when needed, protects the inside parts of the hub bearings from road dust and hazards, and is simple in construction and capable of low cost manufacture.

BRIEF DESCRIPTION OF THE DRAWINGS

These and other features of the present invention will be more fully appreciated when considered in light of the following specification and drawings in which.

DETAILED DESCRIPTION OF THE PREFERRED EMBODIMENT

Figure 1:
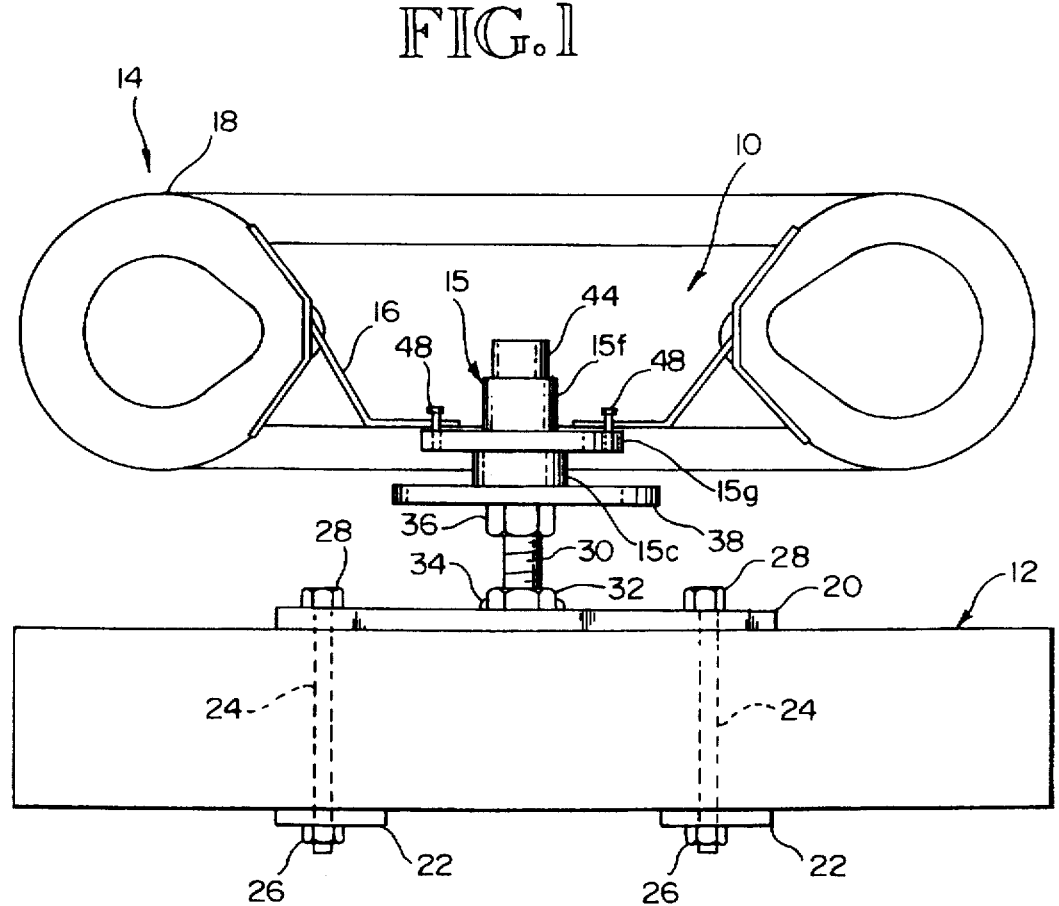
FIG. 1 is a side elevation view of the carrier bracket mounted on the tongue of a trailer vehicle, in which the spare wheel and tire therefor are cutaway at a vertical section for clarity.

As shown in FIG. 1, the preferred embodiment of the invention is shown as a carrier bracket 10 mountable on a vehicle, which in the example is a tongue 12 of a wheeled trailer (not separately shown), for carrying a ready-to-mount spare wheel assembly 14 including a wheel hub 15 having pre-lubricated bearings within, wheel rim 16 and a tire 18. As discussed above, the feature of carrying the entire wheel assembly 14 including a pre-lubricated bearing hub 15 enables the user to have at hand not only a spare wheel, if that is all that is needed, but also a replacement pre-lubricated hub ready to slip on to the axle spindle should that be the cause of the breakdown.

Bracket 10 includes in its illustrated preferred embodiment a base or anchor structure in the form of plate 20 that is adapted to be mounted to the vehicle, in this case to tongue 12 of a trailer. In this illustration, the plate 20 rest on the top face of a square or rectangular hollow tubular tongue 12 and is held in place by straps 22 positioned on the underside flat face of tongue 12 and by threaded tie rods or bolts 24 with nuts and bolt heads 26 and 28 respectively. A set of four mounting holes are provided in anchor plate 20 positioned to clear tongue 12 and a set of four tie rods or bolts 24 pass along the outsides of tongue 12 with the lower ends of the ties being joined to the underside straps 22. Anchor plate 20 can take different forms, and its primary function is to provide a base for supporting a threaded stud 30 that has one end fixed to the anchor plate, in this case, by threading a nut 32 onto an end of stud 30 and then welding nut 32 to plate 20 as indicated by weld fillets 34. A free end of stud 30 shown more clearly by dotted lines in FIG. 2 projects outwardly into a region on the trailer tongue 12 that has sufficient clearance to accommodate not only hub 15 but the wheel rims 16 and tire 18 as depicted. Generally, this will not be a problem as most trailer tongues have sufficient room above the tongue to stow the spare wheel assembly 14. Alternatively, the anchor plate 20 or other base and the projecting threaded stud 30 may be located in different orientations, for example, under tongue 12, to the side of tongue 12 or any other convenient location with sufficient clearance on the body or frame of a vehicle.

Bracket 10 may be fabricated from stainless steel, galvanized steel, or mild steel or other suitably strong, durable and weather resistant materials.

An adjustment nut 36 is threaded onto stud 30 starting at its upper free end in this case and is threaded until it is located somewhat above anchor plate 20. Next, a hub backing plate 38 having a center opening is slipped over the stud 30 until it is stopped against adjusting nut 36 and is held there in a plane normal to stud 30. Plate 38 does not need to be threaded although it could be threaded or welded or otherwise affixed to nut 36 so that these components could be installed and adjusted as a unit. Although not shown in FIG. 1, but depicted in FIG. 2 and more clearly in FIG. 3, an elastomeric sealing washer 40 is slipped over stud 30 and pushed down against the upper face of backing plate 38 to seal against contaminants from entering hub 15 from the underside of the carrier bracket.

The bracket is now ready to receive hub 15 and normally the hub will be mounted first before wheel rim 16 and tire 18 of wheel assembly 14 are attached to the hub. Thus, with reference to FIG. 3, the hub and its internal bearings are greased and the inner bearing 15a and the associated inner seal 15b are installed in the inner cylindrical structure 15c of the hub, whereupon hub 15 with the assembled inner bearing 15a and seal 15b are slipped down over the upwardly projecting stud 30. When the innermost (herein lower) lip of the hub inner cylinder structure 15c rests against backing plate 38 (see FIGS. 1 and 2), the remaining components of the hub are ready to be received. The outer bearing 15d and a washer 15e are placed over stud 30 and pressed down into the outer cylinder structure 15f of hub 15 leaving the uppermost end of stud 30 projecting above a washer 15e. Wheel nut 42 is then threaded onto the upper end of stud 30 to hold the hub 15 and the bearing and seal and wash-loaded grease reservoir shown in the form of cover 44 including grease fitting 46 is fitted into the inside lip of the outer cylindrical structure 15f of hub 15 to prevent any contaminants from entering the bearings of the hub from above. Also, cover 44 and nut 42 form additional spare parts for use on the vehicle wheel as may be needed in an emergency.

Figure 2:
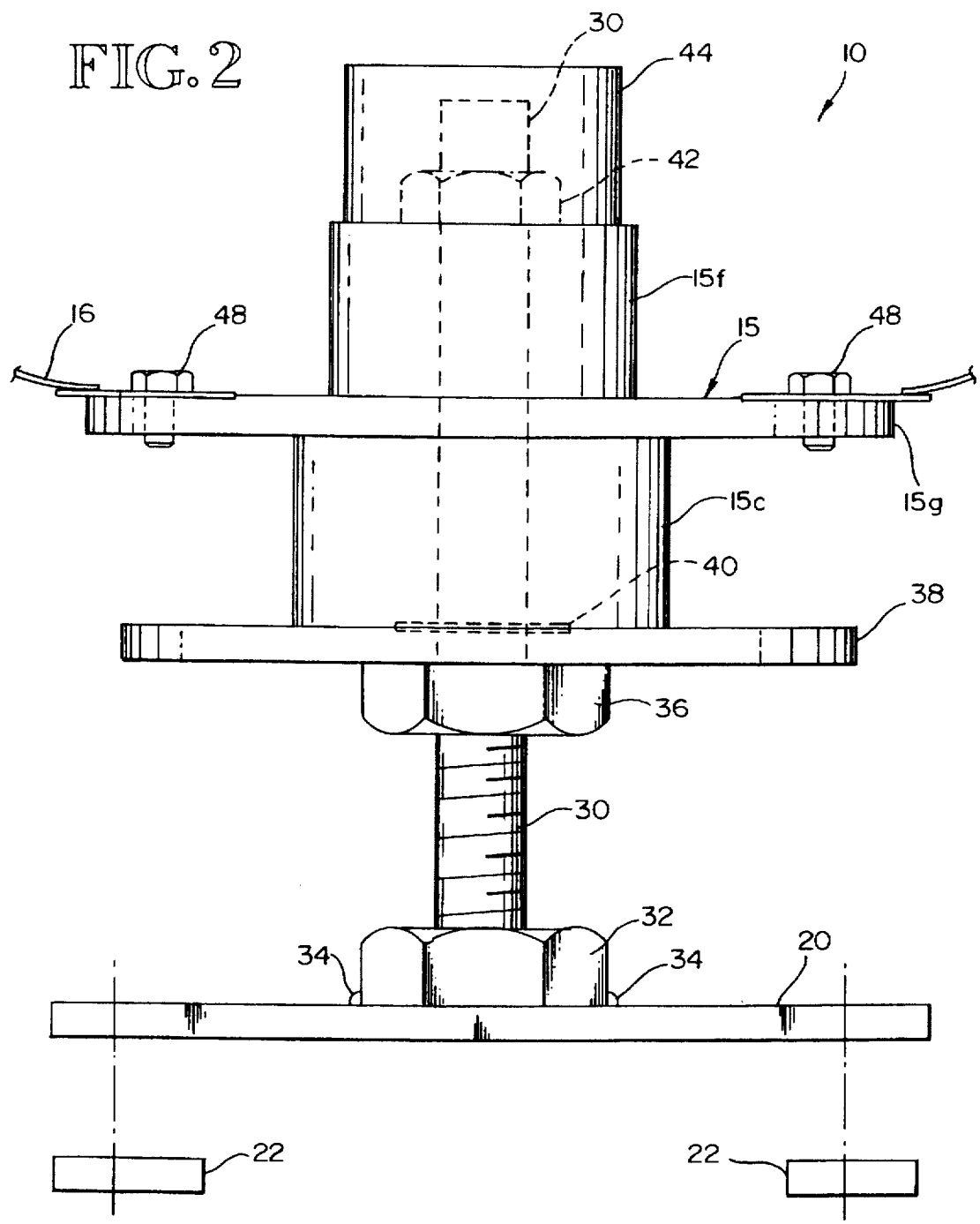
FIG. 2 is a side view similar to FIG. 1 but on an enlarged scale illustrating the carrier bracket holding a spare wheel hub and illustrating fragments of a wheel as it would be mounted to the standard hole pattern on the hub.
Figure 3:
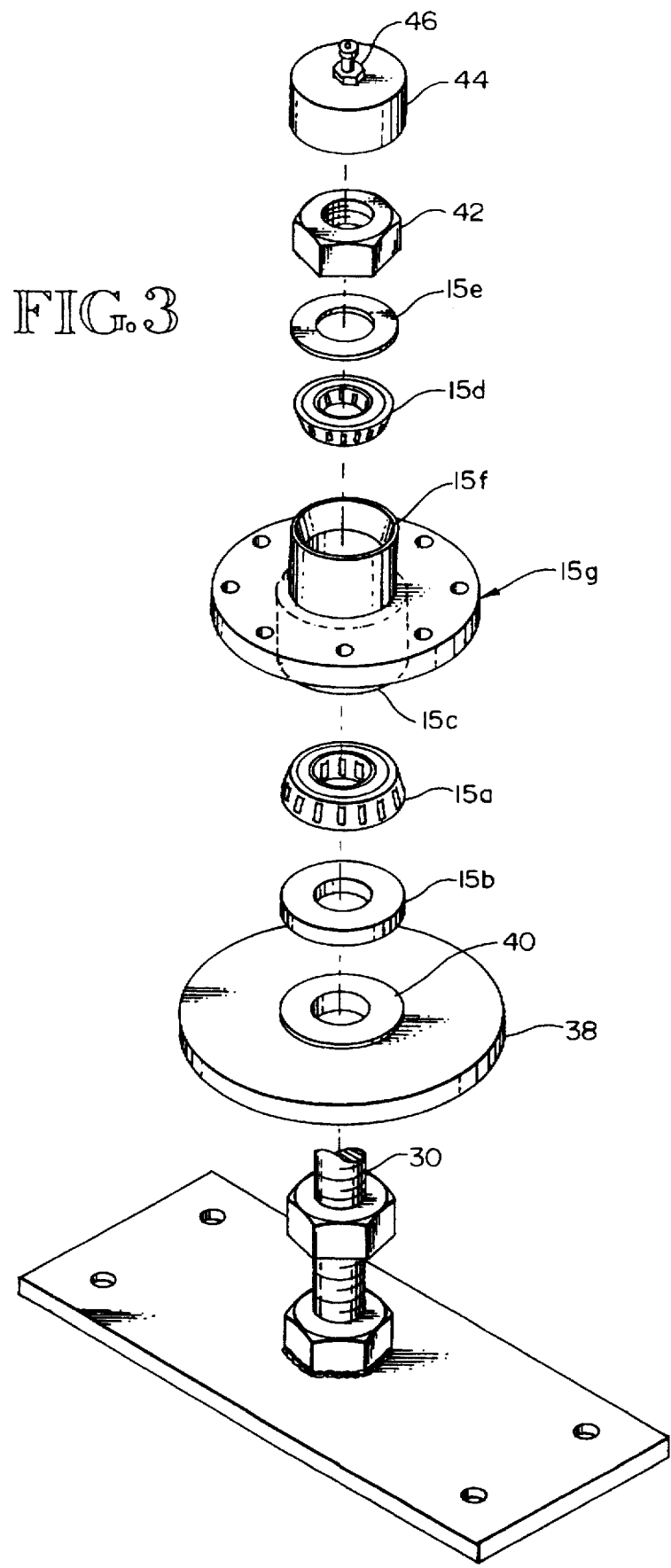
FIG. 3 is an exploded view illustrating the carrier bracket, hub and hub wheel bearings and seal all assembled onto the stud of the carrier bracket in the order shown.

The rest of the wheel assembly including wheel rim 16 and tire 18 are then placed onto hub 15 and secured to the outside, and in this case upper face, of hub flange 15g using the standard wheel rim lug nuts 48 as shown in FIGS. 1 and 2.

When the wheel rim 16 and tire 18 are installed on hub 15 of the carrier bracket 10, it may be necessary to adjust the positioning of backing plate 38 by rotating adjusting nut 36 up or down to provide either clearance for the rim and tire or, if desired, to drop the wheel down to a position closer to the trailer or other vehicle structure for greater stability.

Hub 15 may be of any of a variety of known configurations, including those in the form of a brake drum so that the bracket stowed spare wheel assembly can include all of the parts needed to replace the wheel, including bearings and brake parts.

While bracket 10 is disclosed above as being mounted on the tongue of a trailer, it can be installed on any vehicle at any suitable location, such as on the flat side of a box trailer with the stud 30 projecting horizontally outward to receive and stow the spare wheel assembly.

While only particular embodiments have been disclosed herein, it will be readily apparent to persons skilled in the art that numerous changes and modifications can be made thereto, including the use of equivalent means, devices, and method steps without departing from the spirit of the invention.

What is claimed is:

1. A bracket mountable on a vehicle for carrying a ready-to-mount spare wheel assembly which includes a hub, a pre-lubricated bearing, a wheel rim, and a tire, comprising:

anchor structure adapted to be mounted on a vehicle;

a threaded stud having a fixed end and a free end, said fixed end attached to said anchor structure so as to project the free end of the stud outwardly into a wheel receiving stowage area;

a backing plate sized as a stop against which an inside end of the hub is adapted to rest and having a centered opening sized to fit over said stud;

an adjustable securement device for positioning and securing the backing plate generally perpendicularly to the stud at an adjustable position along the stud at a selected distance from the anchor structure; and a wheel securing nut threaded onto said stud and adapted to secure the hub, and pre-lubricated bearing on the bracket by engaging the pre-lubricated bearing inside the hub whereby the wheel rim and tire are mounted to the thusly secured hub.

2. The bracket of claim 1, wherein said backing plate is a disk sized in outside diameter to be at least as large as the inside end of the hub.

3. The bracket of claim 1, wherein said adjustable securement device comprises an adjustment nut threaded onto said stud on the side of said backing plate opposite from the free end of the stud so as to adjustably locate the backing plate for receiving the wheel assembly.

4. The bracket of claim 1, said anchor structure comprising an anchor plate and means for removably fastening said anchor plate to an exterior part of a vehicle.

5. A ready-to-mount spare wheel assembly and carrier bracket comprising:

a hub, pre-lubricated inner and outer bearings, a wheel rim, and a tire;

an anchor structure adapted to be mounted on a vehicle;

a threaded stud having a fixed end and a free end, said fixed end attached to said anchor structure so as to project the free end of the stud outwardly into a wheel receiving stowage area;

a backing plate sized as a stop against which an inside end of the hub is adapted to rest and having a centered opening sized to fit over said stud;

an adjustable securement device for positioning and securing the backing plate generally perpendicularly to the stud at an adjustable position along the stud at a selected distance from the anchor structure;

a wheel securing nut threaded onto said stud for securing the hub and pre-lubricated bearings on the plate whereby the wheel rim and tire are mounted to the thusly secured hub and a bearing cover installed on an outside end of said hub.

6. The bracket of claim 5, wherein said backing plate is a disk sized in outside diameter to be at least as large as the inside end of the hub which is cylindrical.

7. The bracket of claim 6, further comprising an elastomeric dust seal disposed between said backing plate and the inside end of the hub.

8. The bracket of claim 5, wherein said anchor structure comprises a mounting plate adapted to be attached to a vehicle; said threaded stud having its fixed end attached to said plate and its free end projecting substantially transversely to said plate.

9. The bracket of claim 6, wherein said centered opening is sized to fit snugly over said threaded stud, and an annular sealing means is provided for sealing the region between said threaded stud and said center opening in said backing plate.

10. A ready-to-mount spare wheel assembly and carrier bracket comprising:

a hub, pre-lubricated inner and outer bearings, a wheel rim, and a tire;

an anchor structure adapted to be mounted on a vehicle;

a stud having a fixed end and a threaded free end, said fixed end attached to said anchor structure so as to project the threaded free end of the stud outwardly from said anchor structure;

a backing plate sized as a stop against which an inside end of the hub is adapted to rest and having a centered opening sized to fit over said stud;

an adjustable securement device for positioning and securing the backing plate generally transverse to the stud at an adjustable position along the stud at a selected distance from the anchor structure;

a wheel securing nut threaded onto said stud securing the wheel hub and bearings on the plate whereby the wheel rim and tire are mounted to the thusly secured hub; and a bearing cover installed on an outside end of said hub covering said threaded free end of said stud.

11. The bracket of claim 10, wherein said backing plate is a disk sized in outside diameter to be at least as large as the inside end of the hub which is cylindrical.

12. The bracket of claim 11, further comprising an elastomeric dust seal disposed between said backing plate and the inside end of the hub.

* * * * *